United States Patent
Vanapalli et al.

(10) Patent No.: US 10,677,260 B2
(45) Date of Patent: Jun. 9, 2020

(54) TURBINE ENGINE AND METHOD OF MANUFACTURING

(71) Applicant: General Electric Company, Schenectady, NY (US)

(72) Inventors: Veeraraju Vanapalli, Karnataka (IN); Nitesh Jain, Karnataka (IN); Viswanadha Gupta Sakala, Karnataka (IN); Bhaskar Nanda Mondal, Karnataka (IN); Nicholas Joseph Kray, Mason, OH (US)

(73) Assignee: General Electric Company, Schenectady, NY (US)

( * ) Notice: Subject to any disclaimer, the term of this patent is extended or adjusted under 35 U.S.C. 154(b) by 333 days.

(21) Appl. No.: 15/438,284

(22) Filed: Feb. 21, 2017

(65) Prior Publication Data

US 2018/0238346 A1    Aug. 23, 2018

(51) Int. Cl.
| | |
|---|---|
| *F04D 29/52* | (2006.01) |
| *F04D 29/02* | (2006.01) |
| *F01D 25/26* | (2006.01) |
| *F01D 9/04* | (2006.01) |
| *F01D 25/24* | (2006.01) |
| *F04D 29/40* | (2006.01) |

(Continued)

(52) U.S. Cl.
CPC ............. *F04D 29/526* (2013.01); *F01D 9/04* (2013.01); *F01D 11/08* (2013.01); *F01D 25/24* (2013.01); *F01D 25/246* (2013.01); *F01D 25/26* (2013.01); *F04D 29/023* (2013.01); *F04D 29/403* (2013.01); *F02K 3/06* (2013.01); *F05D 2220/36* (2013.01); *F05D 2230/23* (2013.01); *F05D 2230/642* (2013.01); *F05D 2240/14* (2013.01); *F05D 2240/15* (2013.01); *F05D 2260/941* (2013.01); *F05D 2300/10* (2013.01); *F05D 2300/50212* (2013.01); *F05D 2300/603* (2013.01)

(58) Field of Classification Search
CPC . F01D 9/04; F01D 11/08; F01D 25/24; F01D 25/246; F01D 25/26; F04D 29/403; F04D 29/526; F04D 29/023; F05D 2260/941; F05D 2220/36

See application file for complete search history.

(56) References Cited

U.S. PATENT DOCUMENTS

| | | |
|---|---|---|
| 4,525,998 A | 7/1985 | Schwarz |
| 5,154,575 A | 10/1992 | Bonner |
| 5,163,809 A | 11/1992 | Akgun et al. |

(Continued)

FOREIGN PATENT DOCUMENTS

EP    0559420 A1    9/1993

OTHER PUBLICATIONS

International Search Report and Written Opinion issued in connection with corresponding PCT Application No. PCT/US2018/013989 dated Apr. 30, 2018.

*Primary Examiner* — Brian P Wolcott
(74) *Attorney, Agent, or Firm* — Dority & Manning, P.A.

(57) ABSTRACT

A turbine engine that includes a rotor assembly including a plurality of rotor blades, an outer case positioned radially outward from the plurality of rotor blades, and an annular ring coupled to the outer case and positioned between the plurality of rotor blades and the outer case. The annular ring is configured to restrict thermal contraction of the outer case towards the plurality of rotor blades.

18 Claims, 4 Drawing Sheets

(51) Int. Cl.
*F01D 11/08* (2006.01)
*F02K 3/06* (2006.01)

(56) References Cited

U.S. PATENT DOCUMENTS

| | | | |
|---|---|---|---|
| 5,273,393 A | 12/1993 | Jones et al. | |
| 6,382,905 B1 * | 5/2002 | Czachor | F01D 11/122 415/128 |
| 7,402,022 B2 * | 7/2008 | Harper | F01D 21/045 415/214.1 |
| 8,152,457 B2 | 4/2012 | Flanagan et al. | |
| 8,191,254 B2 * | 6/2012 | Cardarella, Jr. | F01D 21/045 29/889.2 |
| 8,317,456 B2 | 11/2012 | Cardarella, Jr. et al. | |
| 8,371,803 B2 | 2/2013 | Evans | |
| 8,454,298 B2 | 6/2013 | Cardarella, Jr. et al. | |
| 8,966,754 B2 | 3/2015 | Xie | |
| 9,062,565 B2 | 6/2015 | Mahan | |
| 9,114,882 B2 | 8/2015 | Robertson, Jr. et al. | |
| 9,200,531 B2 * | 12/2015 | Robertson, Jr. | F01D 11/125 |
| 9,249,681 B2 | 2/2016 | Robertson, Jr. et al. | |
| 9,255,489 B2 * | 2/2016 | DiTomasso | F01D 11/122 |
| 9,651,059 B2 * | 5/2017 | Robertson, Jr. | F04D 29/023 |
| 2008/0199301 A1 | 8/2008 | Cardarella, Jr. et al. | |
| 2010/0092281 A1 * | 4/2010 | Habarou | F01D 11/08 415/200 |
| 2011/0286839 A1 * | 11/2011 | Wojtyczka | F01D 21/045 415/173.4 |
| 2013/0149098 A1 | 6/2013 | Petty | |
| 2013/0202424 A1 * | 8/2013 | Lussier | F01D 5/08 415/200 |
| 2015/0275695 A1 | 10/2015 | Evans et al. | |

* cited by examiner

TURBINE ENGINE AND METHOD OF MANUFACTURING

BACKGROUND

The present disclosure relates generally to turbine engines and, more specifically, to systems and methods of restricting thermal contraction of an outer case relative to a rotor assembly of a turbine engine.

At least some known gas turbine engines, such as aircraft engines, include an engine casing that extends circumferentially about a rotor assembly of the turbine engine. Known rotor assemblies include at least one row of rotor blades that extend radially outward from a blade root, for example, and the rotor blades include a blade tip that passes proximate a stator assembly of the turbine engine. A radial tip clearance is defined between the rotating blade tips and a stationary component surrounding the rotor assembly.

During engine operation, variations in the thermal environment in the turbine engine may cause thermal expansion or contraction of the rotor and stator assemblies. Such thermal expansion or contraction may not occur uniformly in magnitude or rate. As such, inadvertent rubbing between the rotor blade tips and the surrounding stationary component may occur. Moreover, radial clearances may be created between the rotor blade tips and the surrounding stationary component that are wider than acceptable design clearances. The inadvertent rubbing and the wider clearances may adversely affect engine performance.

BRIEF DESCRIPTION

In one aspect, a turbine engine is provided. The turbine engine includes a rotor assembly including a plurality of rotor blades, an outer case positioned radially outward from the plurality of rotor blades, and an annular ring coupled to the outer case and positioned between the plurality of rotor blades and the outer case. The annular ring is configured to restrict thermal contraction of the outer case towards the plurality of rotor blades.

In another aspect, a method of manufacturing a turbine engine is provided. The method includes positioning an annular ring on a radially inner side of an outer case, wherein the outer case is configured to extend circumferentially about a rotor assembly of the turbine engine. The method further includes pre-stressing the annular ring such that a resistive force is induced on the outer case in a radially outward direction, and such that thermal contraction of the outer case is restricted.

In yet another aspect, a turbine engine is provided. The turbine engine includes a fan assembly including a plurality of fan blades, a fan case positioned radially outward from the plurality of fan blades, and an annular ring coupled to the fan case and positioned between the plurality of fan blades and the fan case. The annular ring is configured to restrict thermal contraction of the fan case towards the plurality of fan blades.

DRAWINGS

These and other features, aspects, and advantages of the present disclosure will become better understood when the following detailed description is read with reference to the accompanying drawings in which like characters represent like parts throughout the drawings, wherein.

Figure 1:
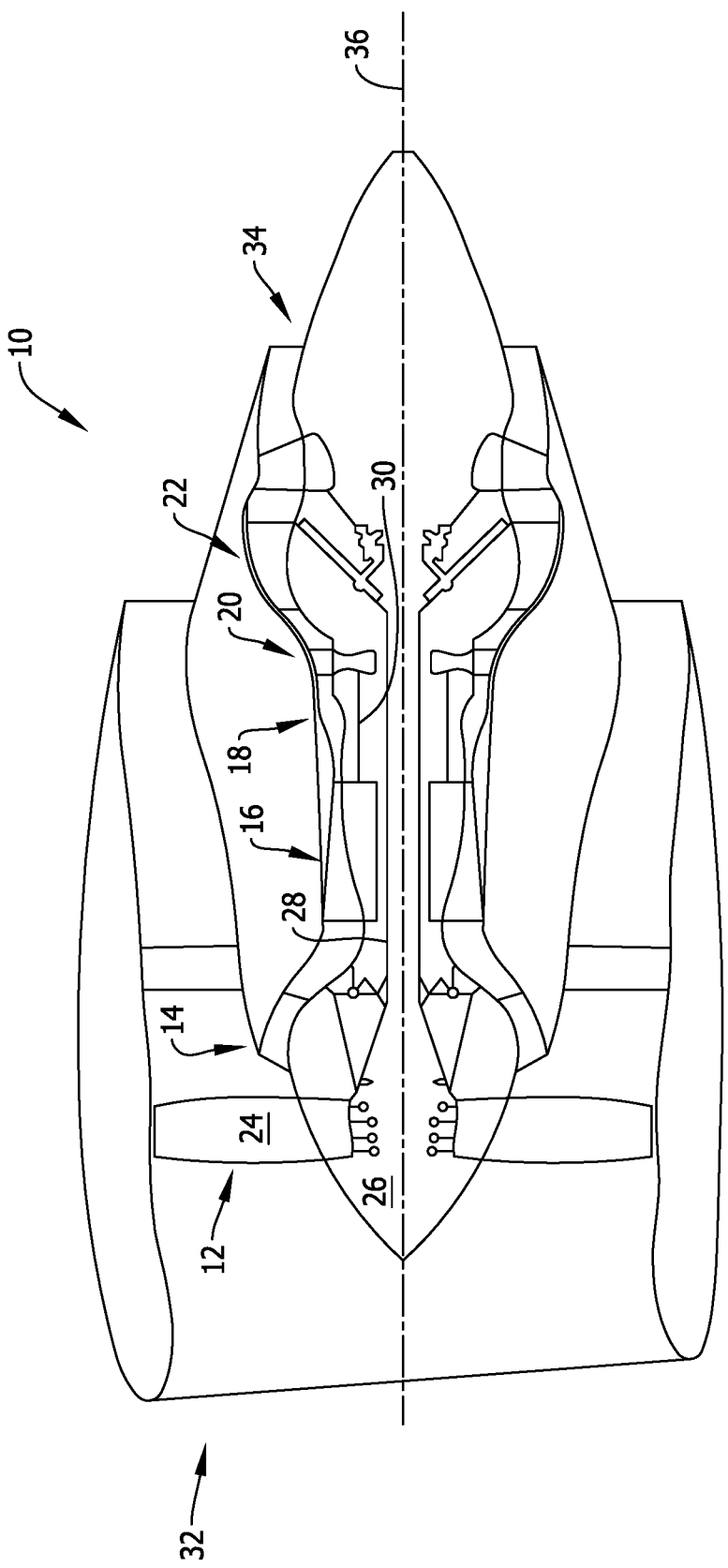
FIG. 1 is a schematic illustration of an exemplary turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Embodiments of the present disclosure relate to systems and methods of restricting thermal contraction of an outer case relative to a rotor assembly of a turbine engine. More specifically, the turbine engine described herein includes an outer case, such as a fan case, including a plurality of rotor blades, and an annular ring coupled on a radially inner side of the outer case. The annular ring and the plurality of rotor blades are fabricated from the same material such that the annular ring and the rotor blades thermally expand and contract at a similar rate and magnitude. In addition, the outer case is fabricated from a material different from the annular ring and the rotor blades such that the outer case thermally expands and contracts at a different rate than the annular ring and rotor blades. As such, coupling the annular ring to the outer case facilitates restricting thermal contraction of the outer case towards the plurality of rotor blades, thereby reducing the likelihood of inadvertent rubbing between tips of the rotor blades and the surrounding stationary assembly.

While the following embodiments are described in the context of a turbofan engine, it should be understood that the systems and methods described herein are also applicable to turboprop engines, turboshaft engines, turbojet engines, ground-based turbine engines, for example.

FIG. 1 is a schematic diagram of an exemplary turbine engine 10 including a fan assembly 12, a low-pressure or booster compressor assembly 14, a high-pressure compressor assembly 16, and a combustor assembly 18. Fan assembly 12, booster compressor assembly 14, high-pressure compressor assembly 16, and combustor assembly 18 are coupled in flow communication. Turbine engine 10 also includes a high-pressure turbine assembly 20 coupled in flow communication with combustor assembly 18 and a low-pressure turbine assembly 22. Fan assembly 12 includes an array of fan blades 24 extending radially outward from a rotor disk 26. Low-pressure turbine assembly 22 is coupled to fan assembly 12 and booster compressor assembly 14 through a first drive shaft 28, and high-pressure turbine assembly 20 is coupled to high-pressure compressor assembly 16 through a second drive shaft 30. Turbine engine 10 has an intake 32 and an exhaust 34. Turbine engine 10 further includes a centerline 36 about which fan assembly 12, booster compressor assembly 14, high-pressure compressor assembly 16, and turbine assemblies 20 and 22 rotate.

In operation, air entering turbine engine 10 through intake 32 is channeled through fan assembly 12 towards booster compressor assembly 14. Compressed air is discharged from booster compressor assembly 14 towards high-pressure compressor assembly 16. Highly compressed air is channeled from high-pressure compressor assembly 16 towards combustor assembly 18, mixed with fuel, and the mixture is combusted within combustor assembly 18. High temperature combustion gas generated by combustor assembly 18 is channeled towards turbine assemblies 20 and 22. Combustion gas is subsequently discharged from turbine engine 10 via exhaust 34.

Figure 2:
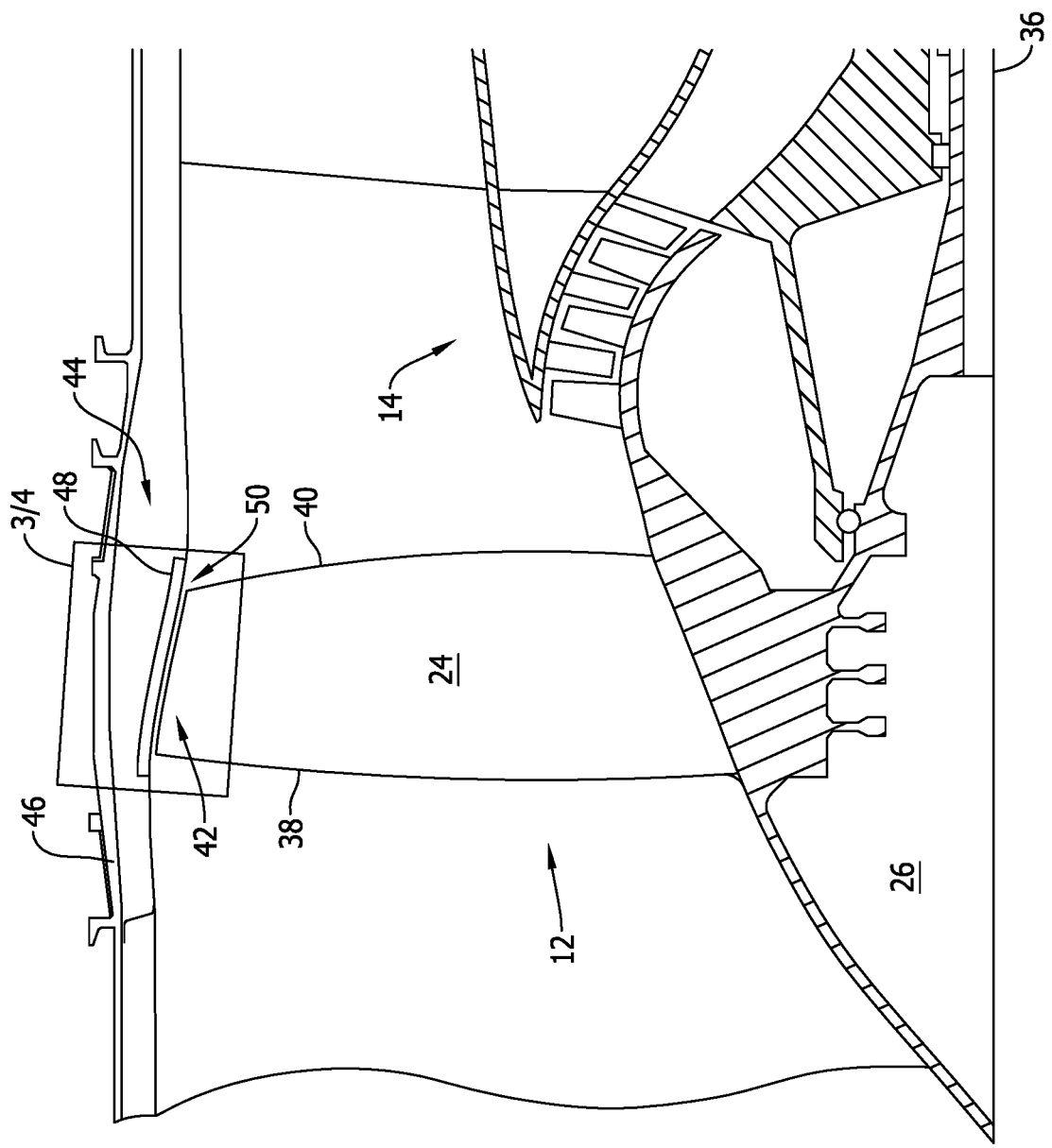
FIG. 2 is a cross-sectional view of a fan assembly that may be used in the turbine engine shown in FIG. 1.

FIG. 2 is a cross-sectional view of fan assembly 12 (hereinafter also referred to as a "rotor assembly") that may be used in turbine engine 10 (shown in FIG. 1). As described above, fan assembly 12 includes a plurality of fan blades 24 (hereinafter also referred to as a "rotor blades") that rotate relative to centerline 36. Each fan blade 24 includes a leading edge 38, a trailing edge 40, and a blade tip 42 positioned radially outward from rotor disk 26. More specifically, blade tip 42 is positioned proximate to a stator assembly 44 that extends circumferentially about fan assembly 12. Stator assembly 44 includes a fan case 46 (hereinafter also referred to as an "outer case") and a shroud 48 positioned radially outward from the plurality of fan blades 24. Shroud 48 is spaced a distance from blade tip 42 such that a clearance gap 50 is defined therebetween. While described in the context of fan assembly 12, the embodiments described herein are applicable to any rotor assembly such as, but not limited to, turbine assemblies 20 and 22 (shown in FIG. 1).

Figure 3:
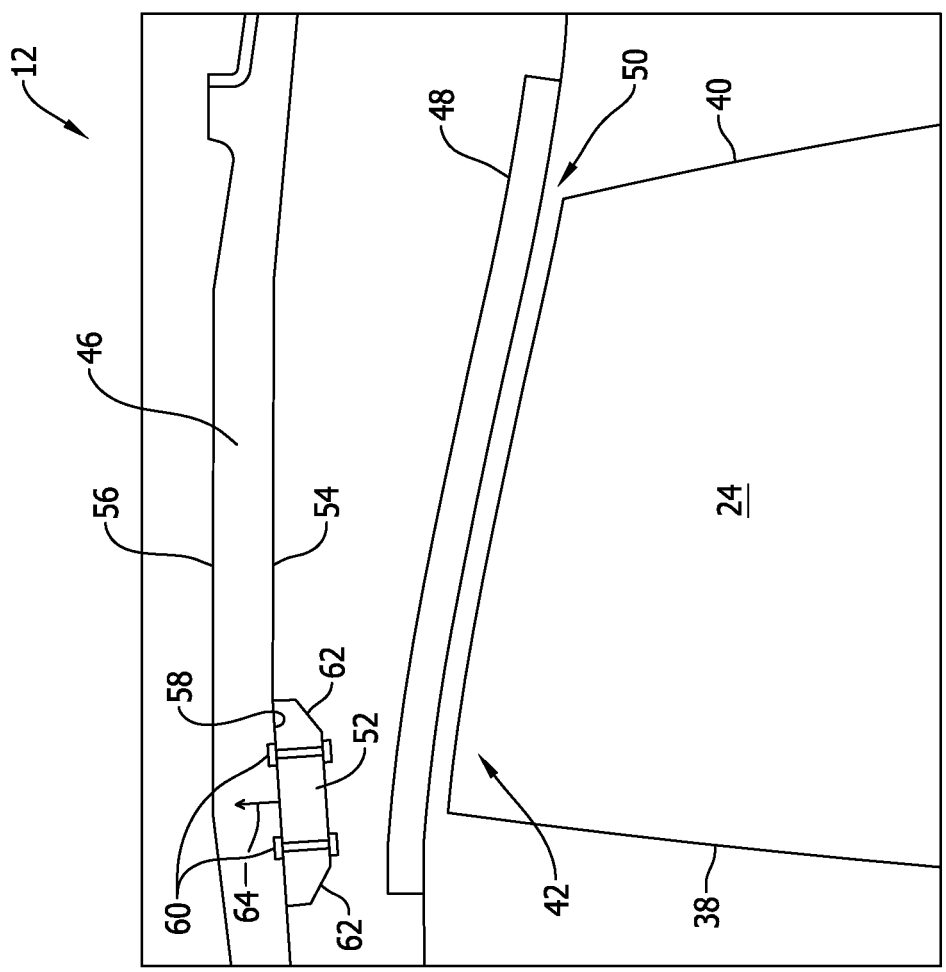
FIG. 3 is an enlarged cross-sectional view of a portion of the fan assembly shown in FIG. 2 taken along Area 3, in accordance with a first embodiment of the disclosure.

FIG. 3 is an enlarged cross-sectional view of a portion of fan assembly 12 taken along Area 3 (shown in FIG. 2). In the exemplary embodiment, fan assembly 12 further includes an annular ring 52 coupled to fan case 46 and positioned between the plurality of fan blades 24 and fan case 46. Fan case 46 includes a radially inner side 54 and a radially outer side 56, and annular ring 52 is coupled to and extends circumferentially along radially inner side 54 of fan case 46. As such, as will be explained in more detail below, annular ring 52 restricts thermal contraction of fan case 46 radially inward towards the plurality of fan blades 24 when a temperature of fan case 46 is less than a predetermined threshold.

For example, fan blades 24, fan case 46, and annular ring 52 are fabricated from any material that facilitates maintaining clearance gap 50 between blade tip 42 and shroud 48. In one embodiment, fan case 46 is fabricated from a first material having a first coefficient of thermal expansion, and the plurality of fan blades 24 and annular ring 52 are fabricated from a second material having a second coefficient of thermal expansion different from the first coefficient of thermal expansion. The first material is a metallic material and the second material is a composite material. As used herein, "metallic" refers to a single metal material or a metal alloy material. Moreover, the composite material includes, but is not limited to, carbon fiber reinforced polymer material and ceramic matrix composite material. Accordingly, in some embodiments, the first coefficient of thermal expansion is greater than the second coefficient of thermal expansion such that the first material thermally expands and contracts at a greater rate and magnitude than the second material. As such, positioning annular ring 52 on radially inner side 54 of fan case 46 facilitates restricting fan case 46 from thermally contracting towards fan blades 24 at a greater rate or magnitude than annular ring 52.

As described above, each fan blade 24 includes leading edge 38. In the exemplary embodiment, annular ring 52 has an axial length and is positioned to traverse leading edge 38 axially relative to centerline 36 of turbine engine 10 (both shown in FIG. 1). Clearance gap 50 at leading edge 38 is generally smaller than at other axial locations relative to centerline 36 as a result of the high velocity airflow received at leading edge 38, and to facilitate increasing the performance of turbine engine 10. As such, positioning annular ring 52 to traverse leading edge 38 provides localized and strategically located stiffening to fan case 46.

In the exemplary embodiment, a layer 58 of adhesive is positioned between fan case 46 and annular ring 52 to facilitate coupling annular ring 52 to fan case 46. Any adhesive material is positioned between fan case 46 and annular ring 52 that enables turbine engine 10 to function as described herein. For example, in one embodiment and as will be explained in more detail below, the adhesive material is a curable adhesive at temperatures greater than about 200° F., such as temperatures reached during co-bonding of fan case 46 and annular ring 52. Moreover, a fastener 60 is coupled between fan case 46 and annular ring 52, and fastener 60 facilitates coupling annular ring 52 to fan case 46. In addition, annular ring 52 includes at least one tapered edge portion 62 that extends circumferentially about annular ring 52. Tapered edge portion 62 facilitates limiting disbonding between fan case 46 and annular ring 52, and facilitates enhancing load distribution across annular ring 52.

Figure 4:
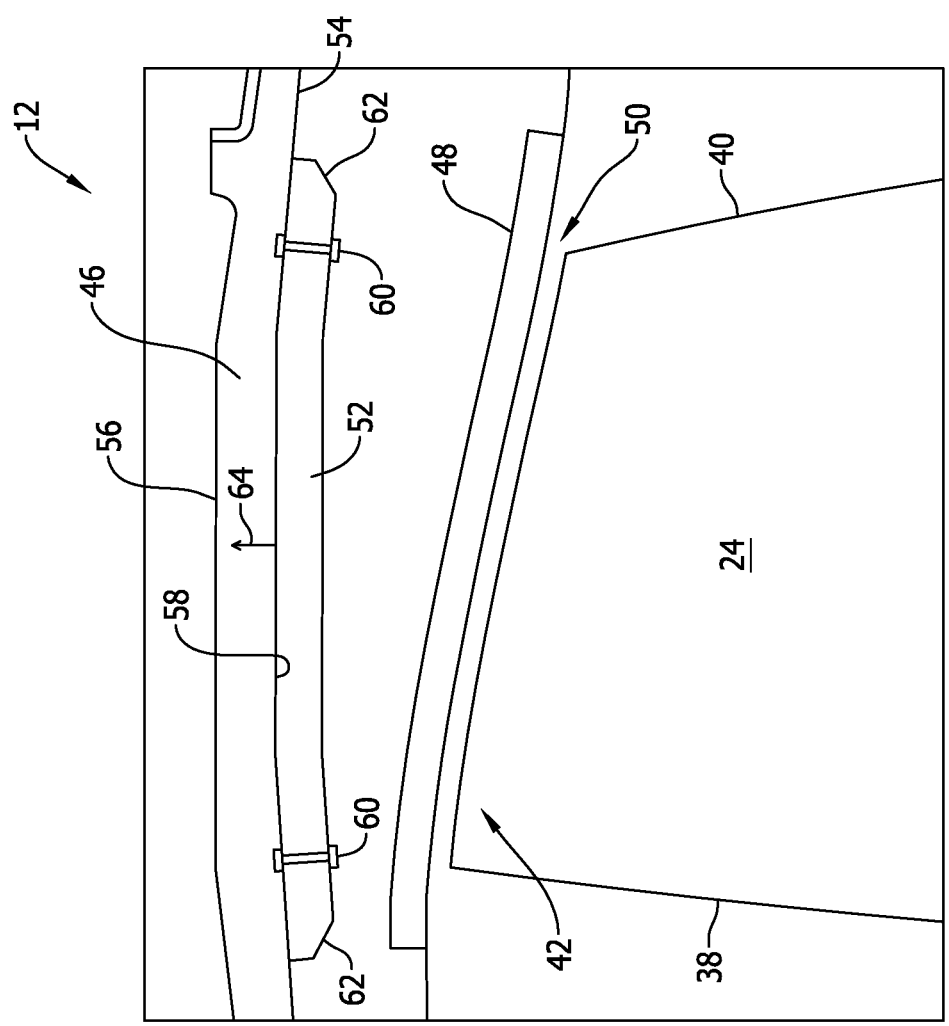
FIG. 4 is an enlarged cross-sectional view of a portion of the fan assembly shown in FIG. 2 taken along Area 4, in accordance with a second embodiment of the disclosure.

FIG. 4 is an enlarged cross-sectional view of a portion of fan assembly 12 taken along Area 4 (shown in FIG. 2). As described above, each fan blade 24 includes trailing edge 40. In the exemplary embodiment, annular ring 52 has an axial length and is positioned to traverse leading edge 38 and trailing edge 40 axially relative to centerline 36 of turbine engine 10 (shown in FIG. 1). As such, annular ring 52 traverses the full axial length of fan blade 24 such that supplemental containment is provided in event of an unexpected blade-out condition.

A method of manufacturing turbine engine 10 is also described herein. The method includes positioning annular ring 52 on radially inner side 54 of fan case 46, where fan case 46 extends circumferentially about fan assembly 12. The method also includes pre-stressing annular ring 52 such that a resistive force 64 is induced on fan case 46 in a radially outward direction, and such that thermal contraction of fan case 46 is restricted.

Annular ring 52 is pre-stressed using any technique that enables turbine engine 10 to function as described herein. For example, pre-stressing annular ring 52 includes forming annular ring 52 on radially inner side 54 of fan case 46, where annular ring 52 is formed in an uncured state, and co-bonding annular ring 52 and fan case 46. In one embodiment, annular ring 52 and fan case 46 are co-bonded in an autoclave at elevated temperatures of at least about 200° F. As such, annular ring 52 is transformed from the uncured state to a cured state, and is coupled to fan case 46 in-situ. In addition, the method further includes positioning layer 58 of adhesive between annular ring 52 and fan case 46 to facilitate coupling annular ring 52 to fan case 46.

Alternatively, pre-stressing annular ring 52 includes heating fan case 46 to a first temperature such that fan case 46 increases in radial size. The method further includes inserting annular ring 52 within fan case 46. In such an embodiment, annular ring 52 is preformed and in a cured state. Fan case 46 then constricts towards annular ring 52 when allowed to cool to a second temperature lower than the first temperature.

More specifically, the method further includes determining an inner diameter of fan case 46 at the first temperature, and forming annular ring 52 having an outer diameter greater than the inner diameter of fan case 46. As such, an interference fit is defined between fan case 46 and annular ring 52 when fan case 46 constricts towards annular ring 52.

An exemplary technical effect of the systems and methods described herein includes at least one of: (a) reducing cold temperature takeoff pinch between rotor and stator assemblies of a turbine engine and improving cruise clearance; (b) improving specific fuel consumption of the turbine engine; (c) increasing the service life of the rotor and stator assemblies; (d) providing supplemental containment in the event of an unexpected blade-out condition; and (e) restricting debris from advancing in a forward direction in the event of an unexpected blade-out condition.

Exemplary embodiments of an annular ring for use with a turbine engine and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only the fan section of a turbine engine. Rather, the exemplary embodiment can be implemented and utilized in connection with many applications where reducing thermal contraction of an annular structure is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine comprising:
    a rotor assembly comprising a plurality of rotor blades;
    an outer case positioned radially outward from said plurality of rotor blades; and
    an annular ring coupled to said outer case and positioned between said plurality of rotor blades and said outer case, said annular ring configured to restrict thermal contraction of said outer case along a radial direction of the turbine engine towards said plurality of rotor blades, wherein said annular ring comprises a tapered edge portion that extends circumferentially about said annular ring,
    and wherein the tapered edge portion includes a taper extending from an inner side of the annular ring along a radial direction.

2. The turbine engine in accordance with claim 1, wherein said outer case is fabricated from a first material having a first coefficient of thermal expansion, and said plurality of rotor blades and said annular ring are fabricated from a second material having a second coefficient of thermal expansion different from the first coefficient of thermal expansion.

3. The turbine engine in accordance with claim 2, wherein the first material is a metallic material and the second material is a composite material.

4. The turbine engine in accordance with claim 1, wherein each rotor blade comprises a leading edge, said annular ring positioned to traverse said leading edge axially relative to a centerline of the turbine engine.

5. The turbine engine in accordance with claim 4, wherein each rotor blade further comprises a trailing edge, said annular ring further positioned to traverse said trailing edge axially relative to the centerline of the turbine engine.

6. The turbine engine in accordance with claim 1 further comprising a layer of adhesive positioned between said outer case and said annular ring.

7. The turbine engine in accordance with claim 1 further comprising a fastener configured to couple said annular ring to said outer case.

8. The turbine engine in accordance with claim 1, wherein said annular ring is pre-stressed such that a resistive force is induced on said outer case in a radially outward direction.

9. The turbine engine in accordance with claim 1, wherein said annular ring is configured to restrict thermal contraction of said outer case along the radial direction towards said plurality of rotor blades by inducing a resistive force on said outer case in a radially outward direction.

10. The turbine engine in accordance with claim 1, wherein the annular ring is fixedly coupled to said outer case along the radial direction.

11. The turbine engine in accordance with claim 1, further comprising:
    a shroud located outward of the plurality of rotor blades along a radial direction of the turbine engine, wherein the annular ring is spaced apart from the shroud along the radial direction.

12. A turbine engine comprising:
a fan assembly comprising a plurality of fan blades;
a fan case positioned radially outward from said plurality of fan blades; and
an annular ring coupled to said fan case and positioned between said plurality of fan blades and said fan case, said annular ring configured to restrict thermal contraction of said fan case along a radial direction of the turbine engine towards said plurality of fan blades, wherein said annular ring comprises a first tapered edge portion that extends circumferentially about said annular ring and a second tapered edge portion that extends circumferentially about said annular ring.

13. The turbine engine in accordance with claim 12, wherein said fan case is fabricated from a first material having a first coefficient of thermal expansion, and said plurality of fan blades and said annular ring are fabricated from a second material having a second coefficient of thermal expansion different from the first coefficient of thermal expansion.

14. The turbine engine in accordance with claim 13, wherein the first material is a metallic material and the second material is a composite material.

15. The turbine engine in accordance with claim 12, wherein each fan blade comprises a leading edge, said annular ring positioned to traverse said leading edge axially relative to a centerline of the turbine engine.

16. The turbine engine in accordance with claim 15, wherein each fan blade further comprises a trailing edge, said annular ring further positioned to traverse said trailing edge axially relative to the centerline of the turbine engine.

17. The turbine engine in accordance with claim 12, wherein said annular ring is pre-stressed such that the resistive force is induced on said outer case in the radially outward direction.

18. A turbine engine comprising:
a rotor assembly comprising a plurality of rotor blades;
an outer case positioned radially outward from said plurality of rotor blades; and
an annular ring coupled to said outer case and positioned between said plurality of rotor blades and said outer case, said annular ring configured to restrict thermal contraction of said outer case towards said plurality of rotor blades;
wherein said annular ring comprises a tapered edge portion that extends circumferentially about said annular ring,
wherein the tapered edge portion comprises a taper that extends outwardly along a radial direction.

* * * * *